2,980,700

PROCESS OF GIBBERELLIC ACID PURIFICATION

Gerald W. Probst, Indianapolis, Ind., assignor to Eli Lilly and Company, Indianapolis, Ind., a corporation of Indiana No Drawing. Filed Jan. 21, 1958, Ser. No. 710,179

5 Claims. (Cl. 260—343.3)

This invention relates to an improved process for obtaining highly purified gibberellic acid from crude fermentation broths.

It is well known that the application of gibberellic acid to plants promotes their growth and that gibberellic acid can be obtained from gibberellic acid-containing broths provided by cultivating a gibberellic acid-producing organism such as *Gibberella fujikuroi* under submerged culture conditions in a suitable nutrient medium. The herein adopted definition of gibberellic acid includes its dihydro derivative, commonly denominated gibberellin A.

Heretofore known methods of recovering gibberellic acid from such broths, although providing material having gibberellic acid activity, have certain undesirable characteristics for use in large scale production. For example, heretofore known methods, such as those which include a carbon adsorption step, are inefficient inasmuch as they do not provide high recoveries of gibberellic acid from gibberellic acid-containing broths. Additionally, the previously known methods inadequately rid recovered gibberellic acid of various plant inhibitory substances usually contained in the employed gibberellic acid broths. To free gibberellic acid from these inhibitory substances is of primary importance since their presence in a gibberellic acid preparation to be applied to plants not only causes undesirable effects on the plants but also interferes with the plant growth-promoting ability of the gibberellic acid constituent of such gibberellic acid preparations. Furthermore, the known methods have economic disadvantages, such as the requirements of large, unrecoverable quantities of costly solvents and of expensive equipment.

It is an object of this invention to provide the desired simple, economical, and efficient process for obtaining purified gibberellic acid from gibberellic acid-containing fermentation broths. A further object of this invention is to provide a method by which gibberellic acid can be separated from plant inhibitors simply and economically. Other objects will become apparent to those skilled in the art from the following disclosure.

In accordance with the above and other objects, I have discovered a process for obtaining purified gibberellic acid from crude fermentation broths, which process comprises extracting gibberellic acid from a filtered gibberellic acid-containing broth into a water-immiscible ketone; adsorbing the gibberellic acid in the ketone extract on an alkali metal bicarbonate salt; washing said alkali metal bicarbonate salt with a nonalcoholic, water-immiscible organic solvent to remove plant inhibitors as well as inert impurities present in said ketone extract; and recovering the adsorbed gibberellic acid, as by elution.

Broadly speaking, the process of this invention is carried out as follows: A broth containing gibberellic acid is provided by following any of the known fermentation procedures, for example that described by Stodola et al. in Archives of Biochemistry and Biophysics 54:240 (1955). The broth thus produced is filtered, and preferably is clarified in any conventional manner. The filtered broth is acidified to a pH in the range between about pH 1 and pH 5 and is extracted with a relatively water-immiscible ketone. In a preferred method of extraction, the broth is extracted about three times employing about one-tenth to one-half its volume of a relatively low molecular weight ketone such as methyl isobutyl ketone. The gibberellic acid contained in the ketone extract is adsorbed on an alkali metal bicarbonate salt, for example sodium or potassium bicarbonate. The adsorption can readily be effected by passing the gibberellic acid solution over a column of the bicarbonate salt, or by adding the salt to the ketone solution and thoroughly stirring the mixture. The amount of bicarbonate salt employed preferably is about 15 to 30 g. per liter of ketone extract. When the column technique is used, it is preferred to employ a column having a height of at least about 15 cm.

The metallic salt upon which the gibberellic acid has been adsorbed is thoroughly washed with a nonalcoholic, water-immiscible solvent. The adsorbed gibberellic acid is then eluted from the washed metallic salt with a suitable water-miscible solvent. The eluate is collected and evaporated to provide a purified gibberellic acid salt suitable for use in compounding commercial products having agricultural and horticultural usefulness.

The free acid form of gibberellic acid can be obtained in crystalline form by acidifying the above salt-containing eluate with a mineral acid to a pH of about pH 3 to pH 5 followed by evaporation of the organic solvent.

The gibberellic acid salt provided by the foregoing procedure generally contains a minor amount of a colored component. A decolorized final product, if desired, can be obtained by inclusion of a decolorization step in the process, which is preferably applied to the above-described eluate containing the alkali metal salt of gibberellic acid, by using a conventional decolorizing agent such as an activated carbon.

The extracting solvent used can be any suitable water-immiscible ketone. The ketone can be symmetrical such as diethyl ketone and di-isopropyl ketone or an unsymmetrical ketone such as methyl ethyl ketone, methyl propyl ketone, methyl isopropyl ketone, ethyl isopropyl ketone, methyl butyl ketone, and methyl isobutyl ketone. Furthermore, the extracting solvent can be a cyclic ketone such as cyclopentanone, 2-methylcyclohexanone, 2,3-dimethylcyclohexanone, and 2-methylcyclopentanone. For reasons of availability and low cost, the preferred extracting solvents are methyl isobutyl ketone and diethyl ketone.

A wide variety of nonalcoholic, water-immiscible solvents, such including ethers, esters, chlorinated hydrocarbons, ketones, and the like, can be used in washing the alkali metal bicarbonate on which the gibberellic acid is adsorbed. For reasons of ease of solvent recovery and efficiency of impurity removal, a low-boiling washing solvent saturated with water is preferred, illustrative preferred solvents being water-saturated ethyl ether or ethyl acetate.

Solvents used to elute the gibberellic acid adsorbed on the washed alkali metal bicarbonate salts can be any suitable water-miscible organic solvent which is compatible with the gibberellic acid and the alkali metal salts. It is desirable to use water-miscible organic solvents for elution which boil at relatively low temperatures. Solvents such as methanol, ethanol, isopropanol, dioxane, Cellusolve, dimethylformamide, and the like are suitable for elution. Methanol and Cellosolve are preferred eluting solvents.

If it is desired to obtain gibberellic acid preparations which are free of gibberellenic acid—a plant innocuous substance frequently present in gibberellic acid broths, the adsorbed gibberellic acid can be preferentially eluted from the alkali metal salt adsorbent by selected eluting agents such as acetonitrile containing about 2 percent water and acetone containing about 5 to 15 percent methanol, preferably about 10 percent methanol. Such preferential elution is ordinarily less efficient and generally results in a lesser yield of gibberellic acid.

The following examples more specifically illustrate this invention but are not meant to be limiting upon its scope.

*Example 1*

10 l. of a fermentation broth containing gibberellic acid are provided by the method as described by Stodola et al. in Archives of Biochemistry and Biophysics 54:240 (1955). 20 g. of the filter aid, Hyflo Super-Cel (a filter aid sold by Johns-Manville Company), are added with stirring to the broth, and the mixture is filtered through a C5 filter pad (a cellulose filter pad sold by Hercules Filter Corporation). After the filtered broth is adjusted to pH 2.0 by the gradual addition with stirring of 1 N hydrochloric acid, the broth is extracted with the following successive quantities of methyl isobutyl ketone: 3.5 l., 1.25 l., and 1.25 l. The combined extracts are passed through a column composed of 130 g. of sodium bicarbonate, the column bed having a diameter of 2.5 cm. and a height of about 23 cm. To remove impurities and residual methyl isobutyl ketone the column is washed with about one liter of ethyl ether saturated with water. The adsorbed gibberellic acid is eluted from the washed column with one liter of methanol.

To the methanol eluate is added 10 g. of "Norit" S.G. (a decolorizing carbon sold by the Union Carbide Corporation) and the mixture is stirred for 15 minutes after which the "Norit" S.G. is removed by filtration. The filter cake is washed with 100 ml. of methanol and the methanol washing solvent is added to the filtrate. The combined methanol filtrate is adjusted to pH 5 by the addition with stirring of 1 N sulfuric acid. The insoluble sodium sulfate formed is removed by filtration and washed with about 100 ml. of methanol, which washing solvent is added to the methanol filtrate. The methanol is slowly removed by evaporation from the combined filtrate until free gibberellic acid crystallizes out of solution. The crystalline gibberellic acid is removed by filtration. The product is identified as gibberellic acid by a biological pea assay such as described by P. W. Briar and H. G. Hemmin in Physiol. Plant 8:669 (1955). The yield of crystalline gibberellic acid is 2.44 g.

*Example 2*

6 l. of a methyl isobutyl ketone extract of gibberellic acid are obtained from a 10 l. quantity of a fermentation broth containing gibberellic acid by the procedure described under Example 1. 120 g. of granular potassium bicarbonate are added to the ketone extract and the mixture is stirred for 24 hours. The potassium bicarbonate, upon which the gibberellic acid is adsorbed, is removed by filtration. Washing of the metallic bicarbonate adsorbent, elution of gibberellic acid from the washed adsorbent, and recovery of crystalline gibberellic acid are carried on in the manner described above in Example 1. The yield of crystalline gibberellic acid is 2.2 g.

I claim:

1. A process for obtaining a purified alkali metal salt of gibberellic acid, which comprises extracting a filtered gibberellic acid-containing broth with a water-immiscible ketone selected from the group consisting of the water-immiscible aliphatic and alicyclic ketones having from four to eight carbon atoms, adsorbing the gibberellic acid in the ketone extract on soild alkali metal bicarbonate salt, washing occluded impurities from the resulting adsorbate, and recovering the gibberellic acid salt of said alkali metal from the washed adsorbate.

2. The process of claim 1 wherein said alkali metal salts are potassium salts.

3. The process of claim 1 wherein said alkali metal salts are sodium salts.

4. A process for obtaining a purified alkali metal salt of gibberellic acid, which comprises extracting a filtered gibberellic acid-containing broth with a water-immiscible ketone selected from the group consisting of the water-immiscible aliphatic and alicyclic ketones having from four to eight carbon atoms, adsorbing the gibberellic acid in the ketone extract on solid alkali metal bicarbonate salt, washing the alkali metal bicarbonate salt and the gibberellic acid alkali metal salt adsorbed thereon with a nonalcoholic, water-immiscible organic liquid selected from the group consisting of ethers, esters, chlorinated hydrocarbons, and ketones to remove impurities, and eluting the adsorbed alkali metal salt of the gibberellic acid.

5. A process for obtaining a purified sodium salt of gibberellic acid, which comprises extracting a filtered gibberellic acid-containing broth with methyl isobutyl ketone, adsorbing the gibberellic acid in the ketone extract on solid sodium bicarbonate salt, washing the sodium bicarbonate salt and the gibberellic acid sodium salt adsorbed thereon with ethyl ether saturated with water to remove plant inhibitors and inert impurities, and eluting with methanol the adsorbed sodium salt of the gibberellic acid.

References Cited in the file of this patent

FOREIGN PATENTS 783,611     Great Britain _____ Sept. 25, 1956

OTHER REFERENCES

Pribyl et al.: Abstract of application Serial Number 651,612, published May 9, 1950, vol. 634 O.G., p. 646.

Borrow et al.: "J. Sci. Food Agr.," page 343 (1955).